(12) United States Patent
Rodriguez

(10) Patent No.: US 8,858,040 B2
(45) Date of Patent: Oct. 14, 2014

(54) COOLING METHODOLOGY FOR HIGH BRIGHTNESS LIGHT EMITTING DIODES

(75) Inventor: Edward T. Rodriguez, Wakefield, MA (US)

(73) Assignee: Cooliance, Inc., Warwick, RI (US)

(*) Notice: Subject to any disclaimer, the term of this patent is extended or adjusted under 35 U.S.C. 154(b) by 496 days.

(21) Appl. No.: 13/215,146

(22) Filed: Aug. 22, 2011

(65) Prior Publication Data
US 2012/0044642 A1 Feb. 23, 2012

Related U.S. Application Data

(60) Provisional application No. 61/376,165, filed on Aug. 23, 2010.

(51) Int. Cl.
| | | |
|---|---|---|
| *F21V 29/02* | (2006.01) | |
| *F21V 23/02* | (2006.01) | |
| *F21V 15/01* | (2006.01) | |
| *H05B 33/08* | (2006.01) | |
| *F21Y 101/02* | (2006.01) | |
| *F21V 29/00* | (2006.01) | |
| *F21V 23/00* | (2006.01) | |

(52) U.S. Cl.
CPC .......... *F21V 29/027* (2013.01); *F21Y 2101/02* (2013.01); *F21V 29/2206* (2013.01); *F21V 23/003* (2013.01); *F21V 29/2293* (2013.01); *F21V 29/022* (2013.01); *F21V 15/011* (2013.01); *H05B 33/0803* (2013.01); *F21V 23/02* (2013.01); *F21V 29/2275* (2013.01)
USPC .......................................... 362/373; 362/294

(58) Field of Classification Search
CPC ..... F21V 29/02; F21V 29/022; F21V 29/025; F21V 29/2275; F21V 29/40; F21V 29/027; F21V 15/011; F21V 29/2293; F21V 23/003; F21V 23/02; F21V 29/2206; F21Y 2101/02

USPC .......... 236/1 C; 307/155, 156, 157; 362/294, 362/377
See application file for complete search history.

(56) References Cited

U.S. PATENT DOCUMENTS

| | | | | |
|---|---|---|---|---|
| 5,634,711 | A  * | 6/1997  | Kennedy et al. | 362/119 |
| 6,799,864 | B2 * | 10/2004 | Bohler et al. | 362/236 |
| 7,543,961 | B2 * | 6/2009  | Arik et al. | 362/294 |
| 7,712,926 | B2 * | 5/2010  | Matheson | 362/294 |
| 8,070,324 | B2 * | 12/2011 | Kornitz et al. | 362/294 |
| 8,212,469 | B2 * | 7/2012  | Rains et al. | 313/503 |

OTHER PUBLICATIONS

Rodriguez, Cooling a High Density DC-DC Converter Impacts Performance and Reliability, PCIM, Nov. 1999, p. 60-66.
Paparrizos, An Integrated Fan Speed Control Solution Can Lower System Costs, Reduce Acoustic Noise, Power Consumption and Enhance System Reliability, Microchip, 2003.
Keranen, Special Report: Effects of Dust on Computer Electronics, an Mitigating Approaches, www.computerdust.com, 2009.
Impingement-cooled heat sink, Cool Innovations.

* cited by examiner

Primary Examiner — Alan Cariaso

(57) ABSTRACT

The present invention is a compact, highly efficient method for convectively cooling substrates, where the substrates contain light emitting diodes (LEDs) or other highly dissipative electronic components. The methodology exhibits very low acoustic noise, extended operating life of moving parts and minimum susceptibility to dust. Also, the improved cooling methodology for high brightness light emitting diodes employs one or more high-density, high-surface-area, single or multiple-element metallic structures having superior heat-transfer properties in the presence of low-speed, minimally turbulent air flow, and enhanced electronic-power-management.

13 Claims, 15 Drawing Sheets

COOLING METHODOLOGY FOR HIGH BRIGHTNESS LIGHT EMITTING DIODES

The current application claims a priority to the U.S. Provisional Patent application Ser. No. 61/376,165 filed on Aug. 23, 2010.

FIELD OF THE INVENTION

The present invention relates generally to cooling apparatuses for high brightness light emitting diodes (LEDs). More specifically, it details the use of heat sinks and fans to cool down LEDs in lighting fixtures and circulate air throughout the fixture so that they operate at maximum efficiency.

BACKGROUND OF THE INVENTION

In many general-illumination light emitting diode lighting applications, such as those for fully visible or ceiling-recessed cylindrical-can fixtures used in retail, architecture or entertainment applications, there is a need to remove substantial heat generated by the high brightness LEDs. In such applications, the light output of a given form factor can be limited, not primarily by the electronic drivers or even the LEDs themselves, but rather by managing the amount of LED-originated heat which can be effectively transferred to the surrounding air from a given volumetric space of the desired fixture or housing.

The amount of heat dissipation which can be tolerated for a given LED power level is determined, to a large degree, by the cumulative thermal resistance from the LED PN junctions to the surrounding air. In reference to the article "Cooling a high density converter impacts performance and reliability", regarding the multiplicity of thermal resistances which make up the total thermal resistance path, it is the specific thermal resistance from the LED holding substrate to the surrounding air, which is most important for the purposes of the proposed embodiments of this invention. (1)

In conventional designs, LED substrates are attached to a type of heat sink. Without air flow, these heat sinks are often quite large. If inadequately sized or configured incorrectly, the heat sinks are only able to partially fulfill their role, and will provide insufficient amounts of cooling. Others have employed a variety of active-cooling (i.e. convective) methods. Such methods include circulating air with fans or vibration mechanisms to decrease the substrate-to-air thermal resistance. Heat sinks, coupled with some form of active cooling, can improve the thermal resistance characteristics over that with little or no moving air.

The fundamental advantages of using fan cooling to achieve higher power for a given lighting system has been long known in the lighting industry. For many years, companies have been using fans in high power photographic, projection, and theatrical lighting systems.

It is an expressed purpose of the invention to allow the creation of a fully characterized module which can be treated essentially as a purchased product, ready to be incorporated into a light fixture housing. Also, the present invention allows for the creation of a fully characterized module as a very compact, highly predictable, exceptionally efficient, "plug and play" thermal management component, usable over a wide range of operating conditions. Furthermore, the user has the ability to design lighting fixtures with a degree of compactness, which was often not feasible with prior art.

SUMMARY OF THE INVENTION

The present invention will allow an end user to create a modified plenum chamber in which fan-driven air is drawn into a housing and channeled through a pinned or finned heat sink structure which presents a large surface area to contact turbulent moving air. Heat from a heat source is transferred to the heat sink structure for ultimate transfer to the surrounding air. In other words, the present invention must use as much of the volumetric space in the light-fixture-housing internal as possible for thermal management purposes unencumbered by co-located power supply circuits. Such circuits can be more readily optimized for size, cost, and electrical safety agency considerations if fabricated as external modules, as is current industry practice for most light fixtures employing HID lamps (which typically use external ballasts) or low voltage halogen lamps (which typically use external magnetic or electronic transformers).

The design of the heat sink structure, coupled with significantly reduced air speed, serves to reduce back-pressure-related compromising of cooling objectives and allows more useful air to flow across all surface areas of the heat sink structure. In reference to the article "Fan speed vs. Operating Life and Acoustic noise", a very significant reduction in fan speed reduces not only the back pressure issues but also greatly reduces acoustic noise, minimizes dust susceptibility over long periods of time, and significantly increases fan life (2).

It is a premise of the invention that the arrangement can provide numerous cooling benefits compared to conventional methods (i.e. natural convection, including versions using what is called "the chimney effect") and at much lower acoustic noise levels than generally thought feasible with traditional techniques using combinations of heat sinks and fans. Moreover, the approach can achieve much greater ratios of no-air-flow to high-speed-air-flow thermal resistance than is suggested as being possible by technical literature on commercial heat sink structures.

In one embodiment, the proposed cooling module is shown as a round configuration but other geometries are suitable. The heat sink surface area may be fabricated using pin fins, formed by casting or forging, or may employ more conventional flat or square fins formed by extrusion or specialized machining. The pins in any given application may be long or short to suit the specific application. In fact, the pin length can be reduced to zero so that the heat sink is actually a flat plate. With such a plate, even slow moving air, impacting the plate perpendicularly creates substantial surface turbulence and substantially greater cooling then if air were moving in a way parallel to the plane of the plate.

The actual choice of technique can be strongly influenced by cost, size, form factor, production quantity desired and the amount of heat to be removed. Due to non-linear effects, particular approaches may be more effective at very low power, while a different approach may be better for very high power and more stringent operating conditions. The invention is intended to serve most of the likely approaches by using closely related principles.

In another embodiment, air is axially drawn in at one end by a fan, forced into an array of pins or fins, and then exhausted in a direction generally perpendicular to the direction of intake air. The objective is to have moving air pass over 100% of the heat sink surface areas before being exhausted. In one embodiment of end use, the cooling-module structure is placed within a round cylindrical housing, partially closed at one end, with intake vents being at the partially closed end surface and radial (i.e. side) exit vents being at the other end. It is an objective to have the air-exit vent and the air-intake vent areas be equal to or greater in size to that of the fan air-moving circular area, so that intake vents or exhaust vents do not bottleneck the effectiveness of the fan by constricting air intake or exhaust.

While the focus of the invention is on the cooling module, periodic references are made to the end-user housing. Since any cooling module, however effective in a stand-alone test, is of little use if it cannot provide comparable benefits when used in a practical application. Such a practical application will virtually always involve putting the module within a light-fixture housing of some kind.

Alternatively, in another embodiment the cylindrical fixture can be created so as to be a coaxial structure, similar to a cylinder within a cylinder. In such a case, air is drawn into and is exhausted from the same plane. That is, air can be drawn into the space between the two cylinders and exhausted from the center cylinder.

With proper baffling within the overall dual-cylinder structure, the fan can cause a negative pressure (i.e. a partial vacuum) in the outer space and a positive pressure in the center area. This arrangement results in minimal mixing of outgoing hot air and incoming cool air, allowing all heat exchange to take place in the same plane as the light-emitting surface.

In yet another embodiment, instead of being placed in an enclosure with vents to external air, the heat sink and fan can be in a completely sealed enclosure. In such a case, if the enclosure has appropriate baffling, exhaust air can be purposely drawn back to the intake source for the fan. The circulating loop of air current can make the heat sink more effective in certain configurations. If the total volumetric space of the enclosure is large enough, thermal resistance from the heat sink to the internal enclosure air is sharply reduced by means of the first embodiment's principles and further baffling causes moving, re-circulating air to reach all inner surfaces of the enclosure walls in contact with the outside ambient air. The result can be a weather-tight enclosure which has substantially lighter weight and lower cost for a given power dissipation than a heat-removing enclosure system with no internal moving air.

Generally, certain DC brushless fans can have their speed reduced by lowering the operating voltage. This technique is used here to reduce fan speed, so that at an industry-standard measurement distance of one meter, the fan is inaudible or nearly inaudible. Coincidentally, the lowering of fan speed increases fan life expectancy in a manner generally inversely proportional to speed. Fan life expectancy is known to be highly dependent on the bearing life of a fan. Such bearing life is primarily influenced by ambient temperature and the number of mechanical rotations in the fan's life. For example, a typical DC brushless fan might be rated for 50,000 hours when operated below 40° C. and rated speed. However, operating that fan at half speed can increase the life expectancy to close to 100,000 hours.

In all of the preferred embodiments, the reduced speed lowers acoustic noise and increases life expectancy. To achieve such reduced speed while meeting the overall commercial objectives of the product involves certain electronic control considerations. It can be particularly advantageous if a fixed and desirably lower voltage for the fan can be obtained without the need for a separate power supply.

In the majority of LED lighting applications above 15 watts, there is likely to be an arrangement of LEDs driven by a voltage above 12V, often as high as 45 volts and, although unlikely, possibly sometimes as high as 50-55V. It would be desirable if that same voltage could be used to power the fan, making it unnecessary to employ a separate power supply with its ensuing size and cost penalties.

Consequently, one preferred embodiment of the invention will employ a means to step down or step up that voltage to a lower or higher voltage appropriate for the fan speed desired. That step-down circuit can consist of a buck regulator, a linear regulator or even a simple resistor. A step-up circuit can consist of what is commonly called a boost converter. Those skilled in power circuits are very familiar with how such circuits function and how they could be readily be used to power a 12V fan from a much higher or lower source voltage.

The actual choice of one of the three can be determined by how high the source voltage is above the desired fan voltage or how much that source voltage might vary during normal operation. Suffice it to say that each of the circuits offers pros and cons in terms of size, cost and efficiency depending on what is known (or not known) about the application. But all three share the advantage that no separate power supply is needed to power the fan. In practice, the power drawn by the fan and the control circuit is so low—typically no more than a few percent of total power—that the size, cost and efficiency benefits are far greater than if a separate power supply were to be used.

DETAIL DESCRIPTIONS OF THE INVENTION

Figure 15:
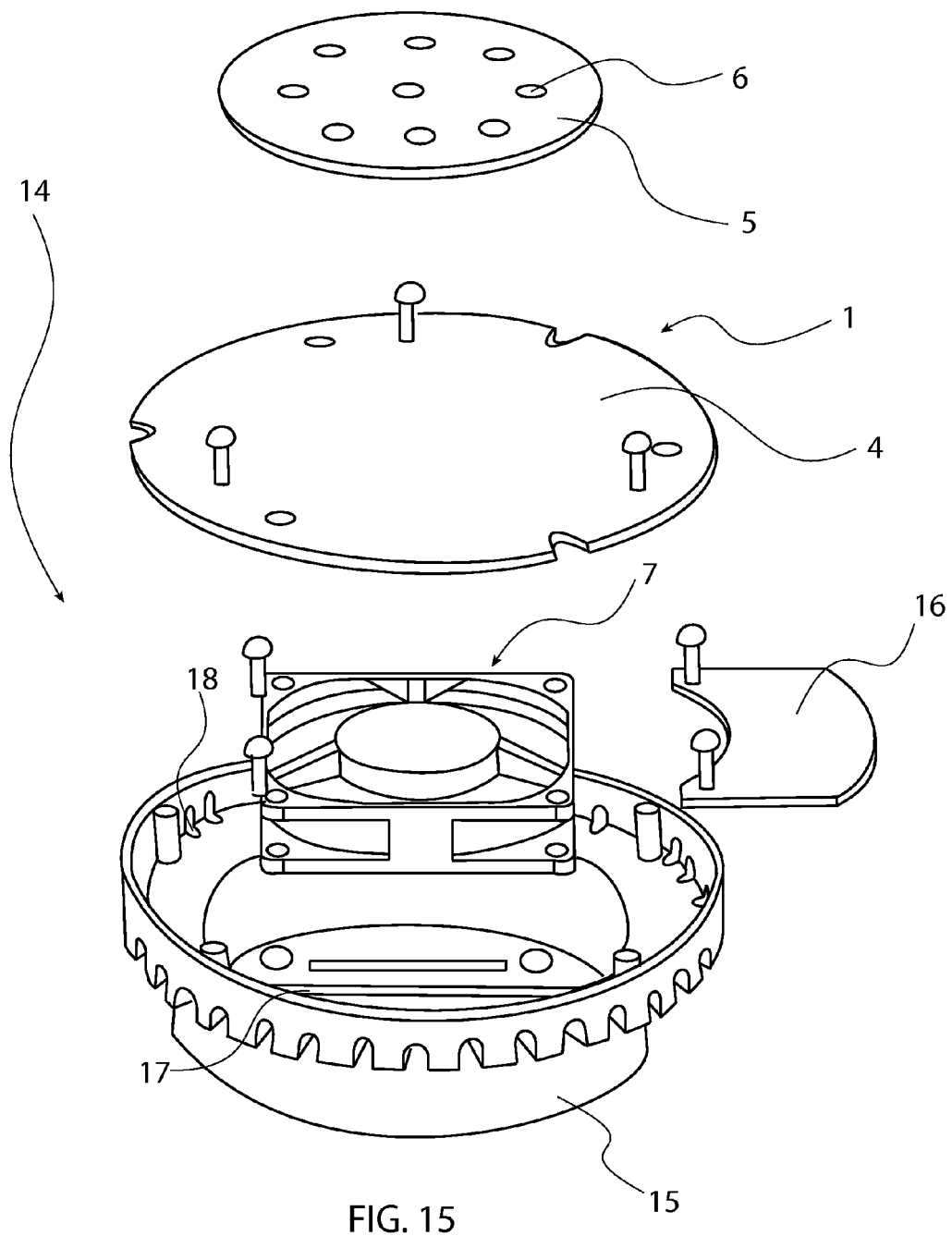
FIG. 15 is an exploded view of an assembly of the cooling apparatus for highly dissipative LEDs within a cooling enclosure.

All illustrations of the drawings are for the purpose of describing selected versions of the present invention and are not intended to limit the scope of the present invention as a cooling apparatus for high brightness LEDs. Referring to FIG. 15, the present invention comprises mainly of a cooling enclosure 14, a 1, a cooling fan 7, a LED substrate 5, and a plurality of LEDs 6.

Figure 1:
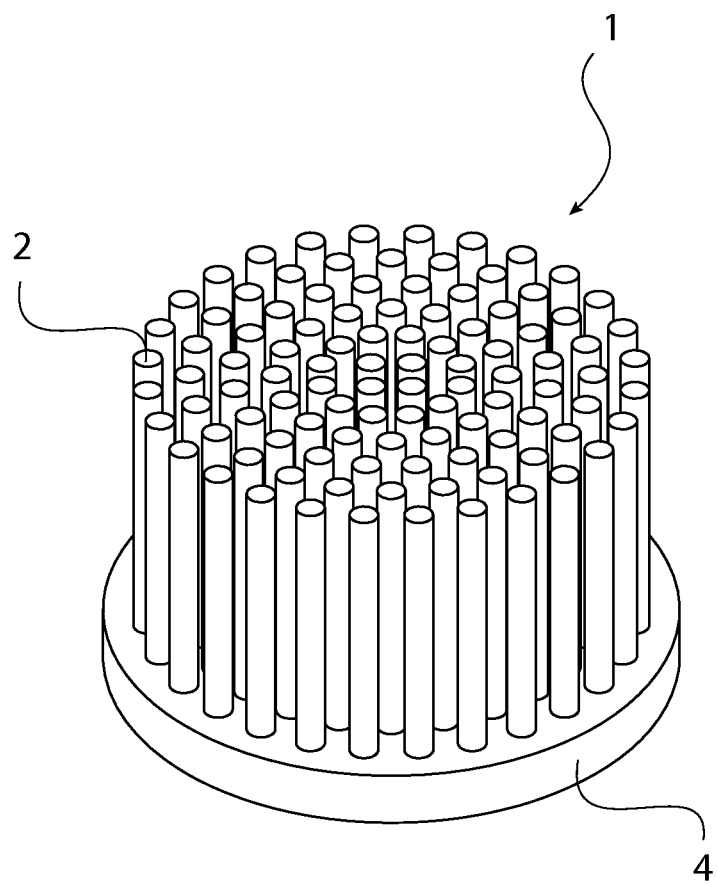
FIG. 1 is a perspective view of a heat sink with a plurality of pins.
Figure 2:
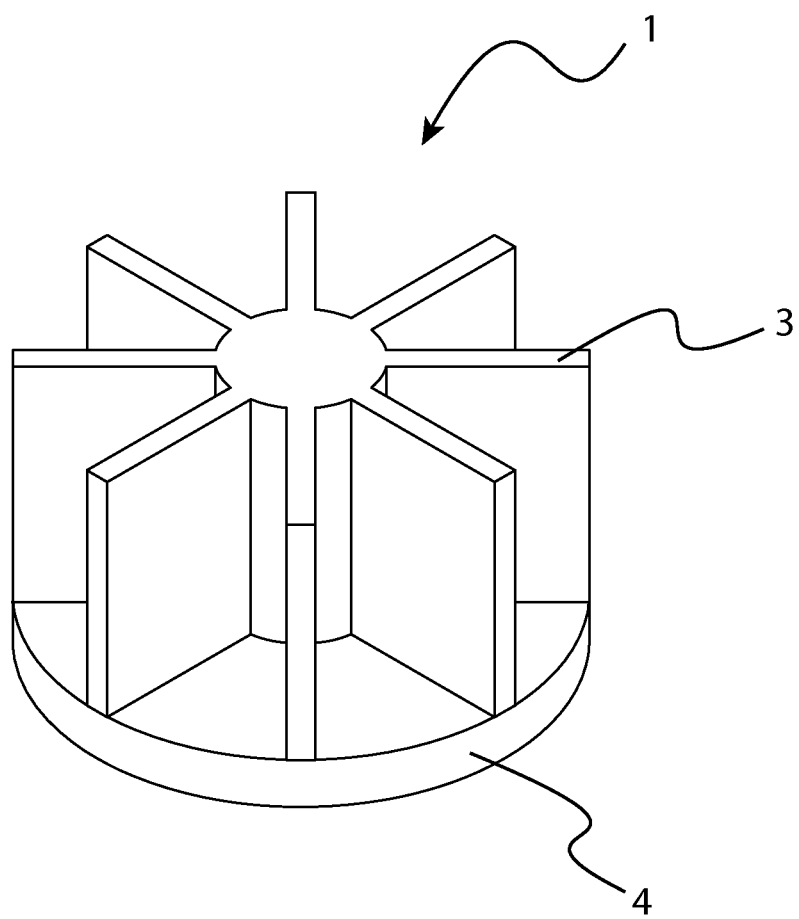
FIG. 2 is a perspective view of a heat sink with a plurality of fins.
Figure 3:
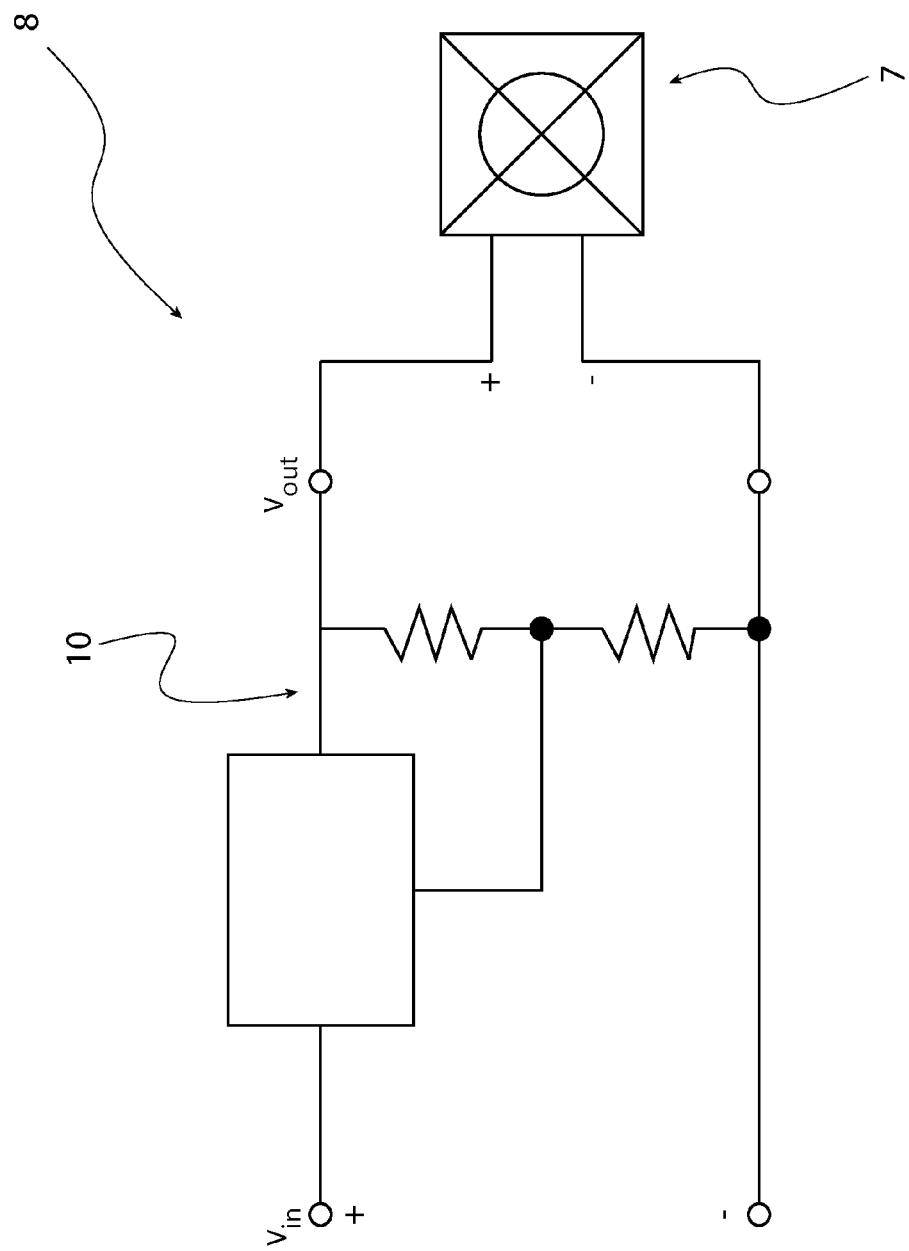
FIG. 3 is a schematic for a linear regulator circuit.
Figure 4:
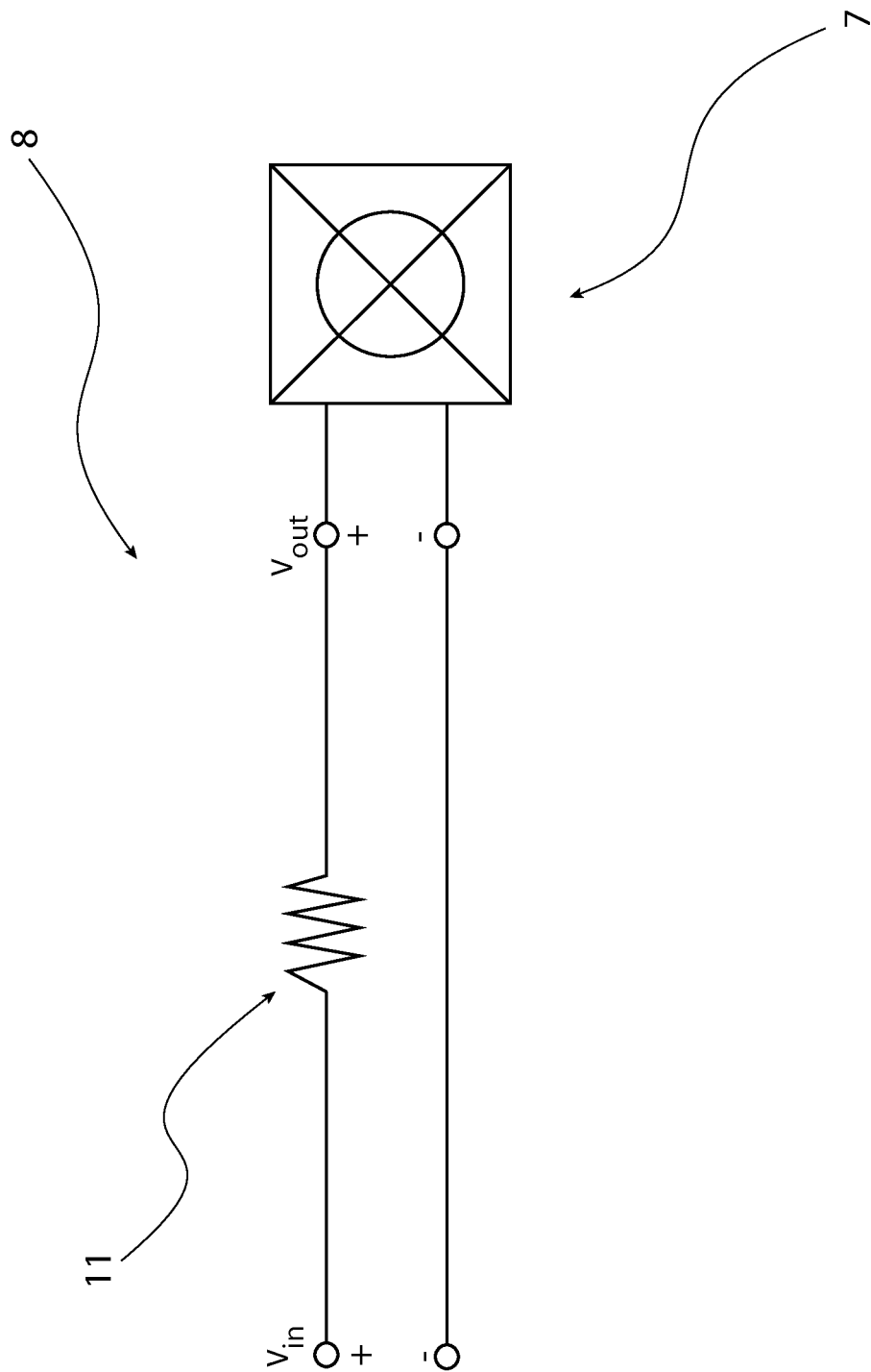
FIG. 4 is a schematic for a resistive regulator circuit.
Figure 14:
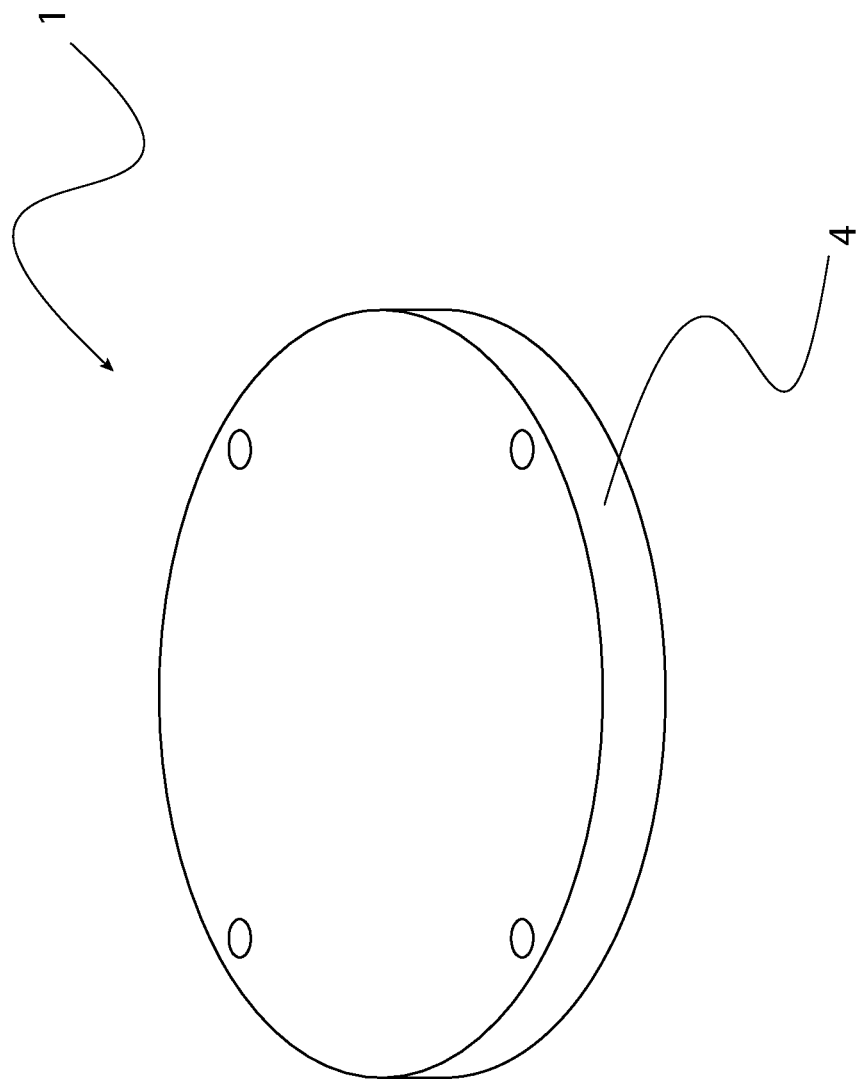
FIG. 14 is a perspective view of a flat plate.

Referring to FIG. 1, FIG. 2, FIG. 14, the heat sink 1 can be fabricated by forging or die casting. The heat sink 1 consists of a mounting surface 4 from which there are a plurality of protrusions 2, 3 from its surface. One type of protrusion is a pin protrusion 2, which is a thin solid cylinder with a structure effective for heat transfer. In other designs, the protrusions could take the form of a plurality of fin protrusions 3. In certain instances, fin protrusions 3 can result in more total protrusion surface area, reduced air flow resistance, or both, thereby resulting in more cooling effectiveness. The fin protrusions 3 resemble spokes and can be made as a single cast, a forged piece, or as a two-piece structure. Also, a two-piece structure can be fabricated by making the fin protrusions 3 as simple extrusions, which are then affixed to the mounting surface 4. The method of fabrication can be based on the cost factors for any given application. Forging has the advantage of being able to fabricate the part while retaining full thermal conductivity of the material. A die-cast part can be a lower cost option, but will exhibit porosity and presence of less thermally conductive metals, both of which lower thermal conductivity, factors which may or may not be important depending on the requirements of the application. The choice of which process to use can be influenced by the overall shape and geometry of the heat sink required, the power levels involved, the amount of air available, the type of fan used, and the cost guidelines. It should be noted that to form an effective heat sink 1, the mounting surface 4 does not necessarily need protrusions 2, 3. Depending on the direction of air flow, a bare mounting surface 4 is capable of achieving somewhat similar levels of heat transfer as its counterparts.

Figure 13:
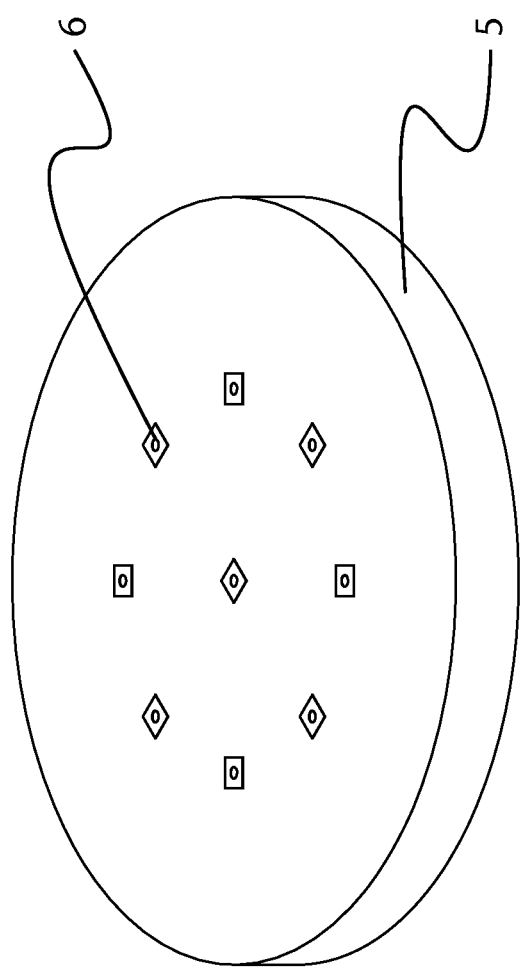
FIG. 13 is a perspective view of a LED substrate and LEDs.

In reference to FIG. 13, the lighting component of the system comprises of the substrate 5 and a plurality of LEDs 6. The substrate 5 supports the LEDs 6, which are mounted on top of the substrate 5. Then, the LEDS 6 and the substrate 5 are located on the heat sink 1, opposite to the pin protrusions 2 or fin protrusions 3. The substrate 5 is typically manufactured as a metal core circuit board (MCB). Typically, the MCB uses an aluminum plate/polymer film/copper-foil laminate, instead of the epoxy glass-laminate normally employed for traditional PC boards. Consequently, the MCB exhibits significantly greater vertical and lateral thermal conductivity. While other manufacturing techniques exist, the MCB process is versatile and lends itself to most standard PC board manufacturing processes.

Figure 11:
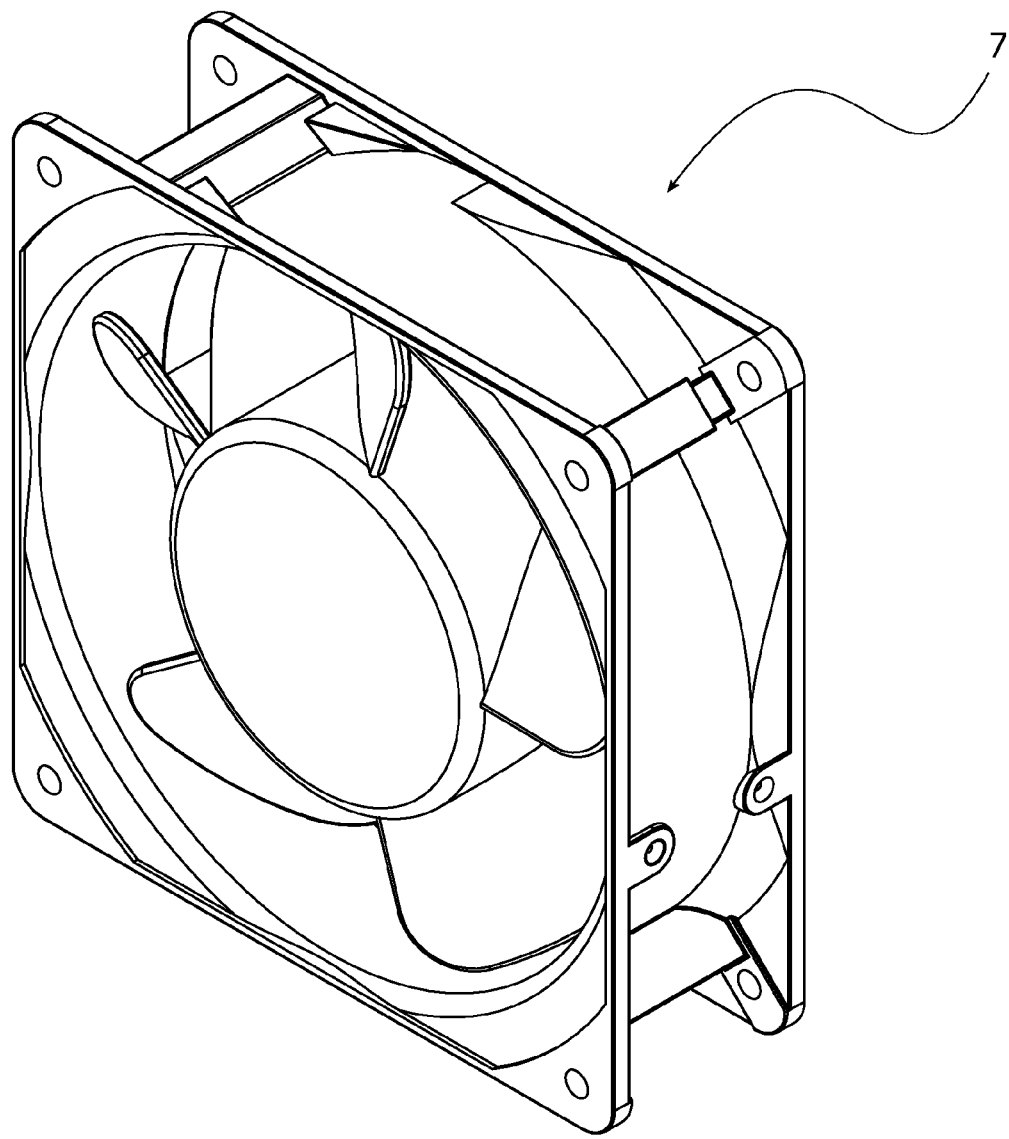
FIG. 11 is a perspective view of a cooling fan.
Figure 12:
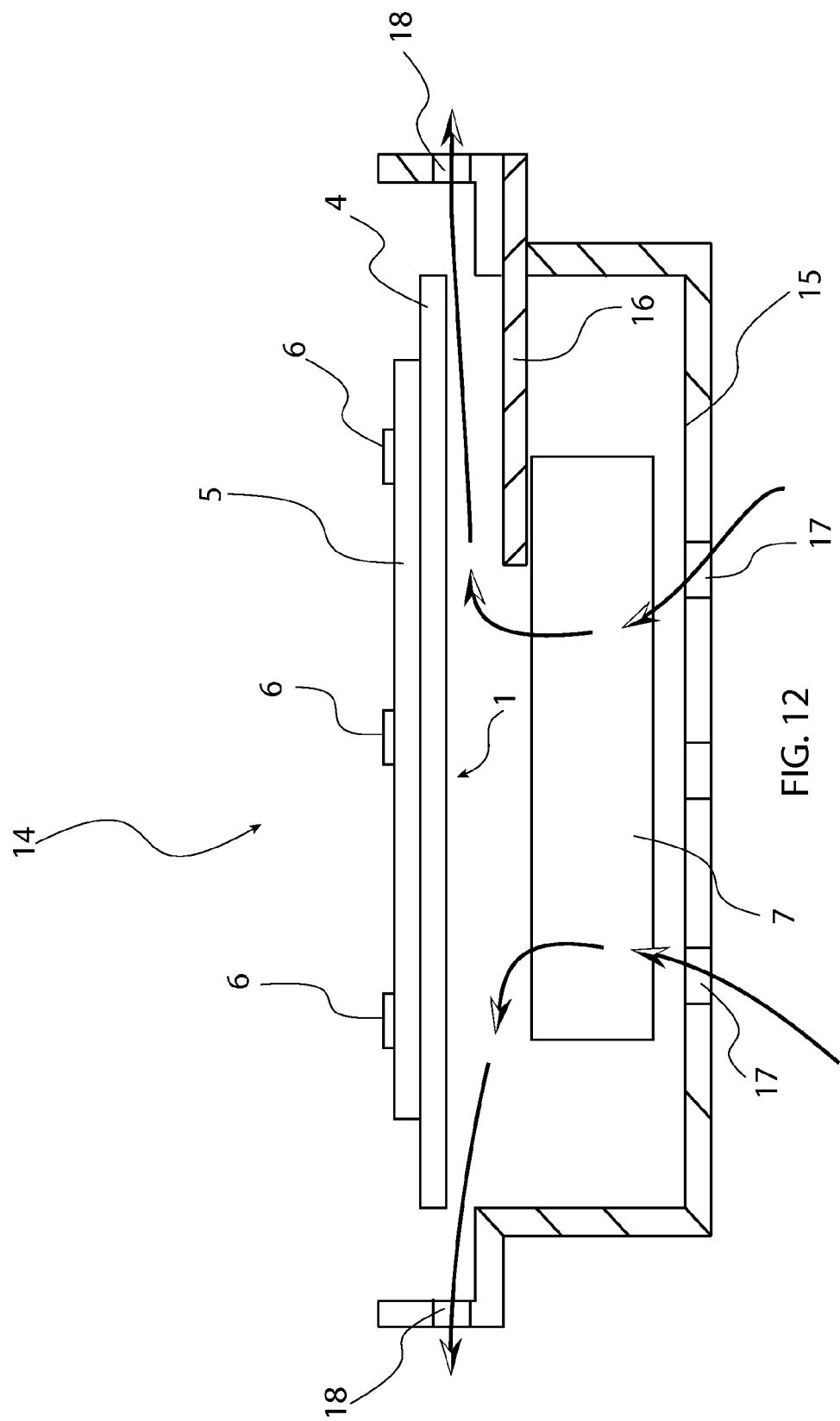
FIG. 12 is a sectional view of an assembly of the cooling apparatus for highly dissipative LEDs within a cooling enclosure.

Referring to FIG. 11, FIG. 12, and FIG. 15, the cooling fan 7 is the main cooling device for the invention. The fan 7 provides cooling for the heat sink 1 by blowing cool air across its surfaces, which is illustrated by the half-filled arrows and their accompanying flow lines. The present embodiment uses a DC brushless fan. Such fans employ an internal electronic circuit, rather than mechanical brushes, which are prone to wearing out, to achieve motor commutation. This feature has allowed these motors to achieve smaller size and much longer life than traditional DC motors with brushes.

Referring to FIG. 3, FIG. 4, FIG. 5, and FIG. 6 voltage for the fan 7 is provided by a voltage regulator and distribution system 8. There are three different kinds of regulator systems 8 presented as options for this invention. One such circuit is a buck regulator circuit 9 that has an on-off switching technique, which exhibits high efficiency. The buck regulator circuit 9 is normally used to reduce a voltage to a lower level and hold it constant in the presence of changing input levels or variations in loading. Another circuit is a linear regulator circuit 10, a well known, low-cost technique. Similar to the buck regulator circuit 9, the linear regulator circuit 10 reduces and stabilizes voltage to a constant level. Although it is not as efficient as the buck regulator circuit 9, the linear regulator circuit 10 is lower in cost and requires fewer components. The most basic circuit that can be used as a means to reduce fan voltage is a simple resistor circuit 11. Similar to the linear regulator circuit 10, the resistor circuit 11 is not as efficient as the buck regulator circuit 9. While the use of a single resistor circuit 11 requires minimal cost, it does not afford much varying-voltage regulation. This means that if the input voltage is a constant known value and only needs to be reduced a small amount for the purpose at hand, the resistor circuit 11 can exhibit acceptable efficiency while maintaining its low cost. However, these conditions are not typically known by the manufacturer or marketer of a cooling apparatus in many LED applications, so the buck regulator circuit 9 and the linear circuit regulator 10 are most appropriate. The voltage regulator system 8 is a versatile component in that it can comprise of a buck regulator circuit 9, a linear regulator circuit 10, or a resistor circuit 11 depending on the requirements of the system.

Figure 5:
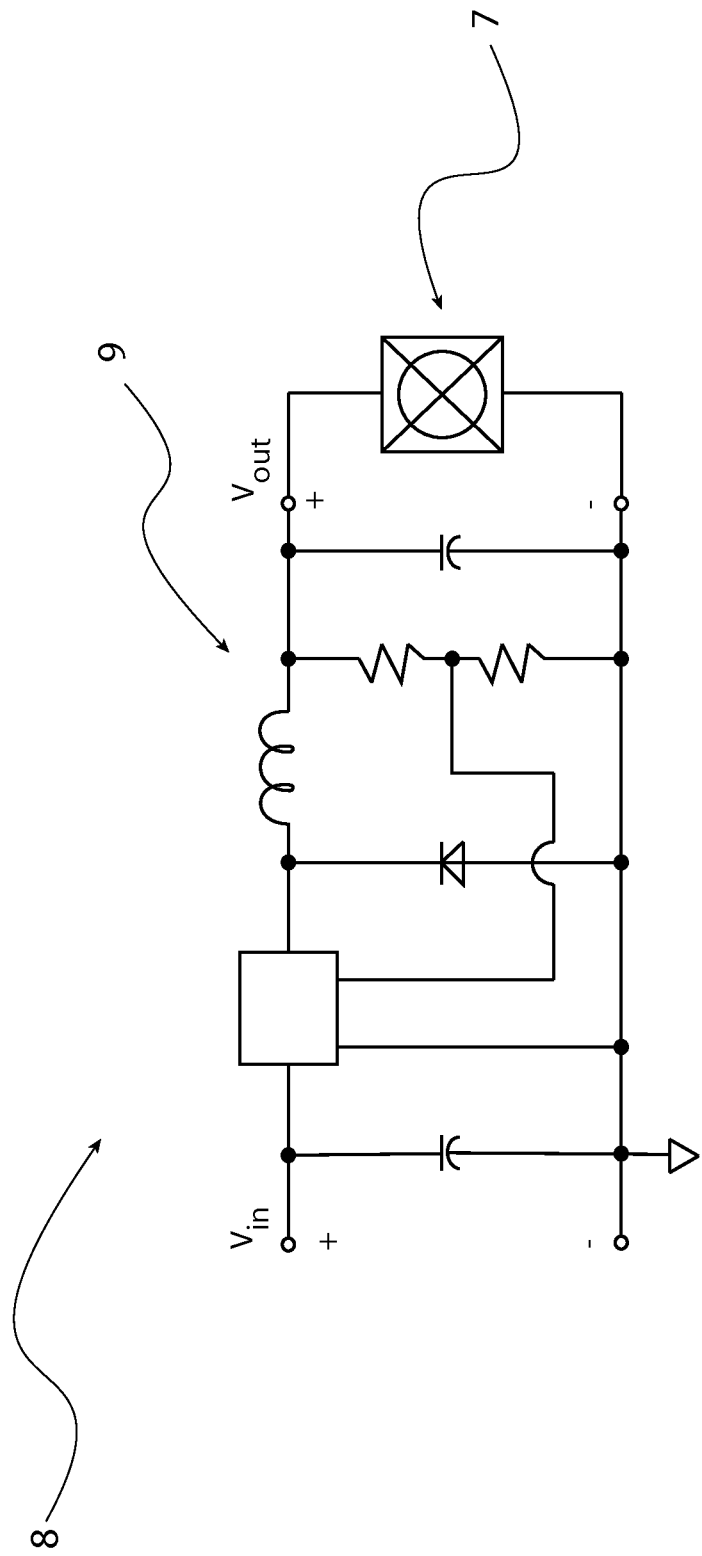
FIG. 5 is a schematic for a buck regulator circuit.
Figure 6:
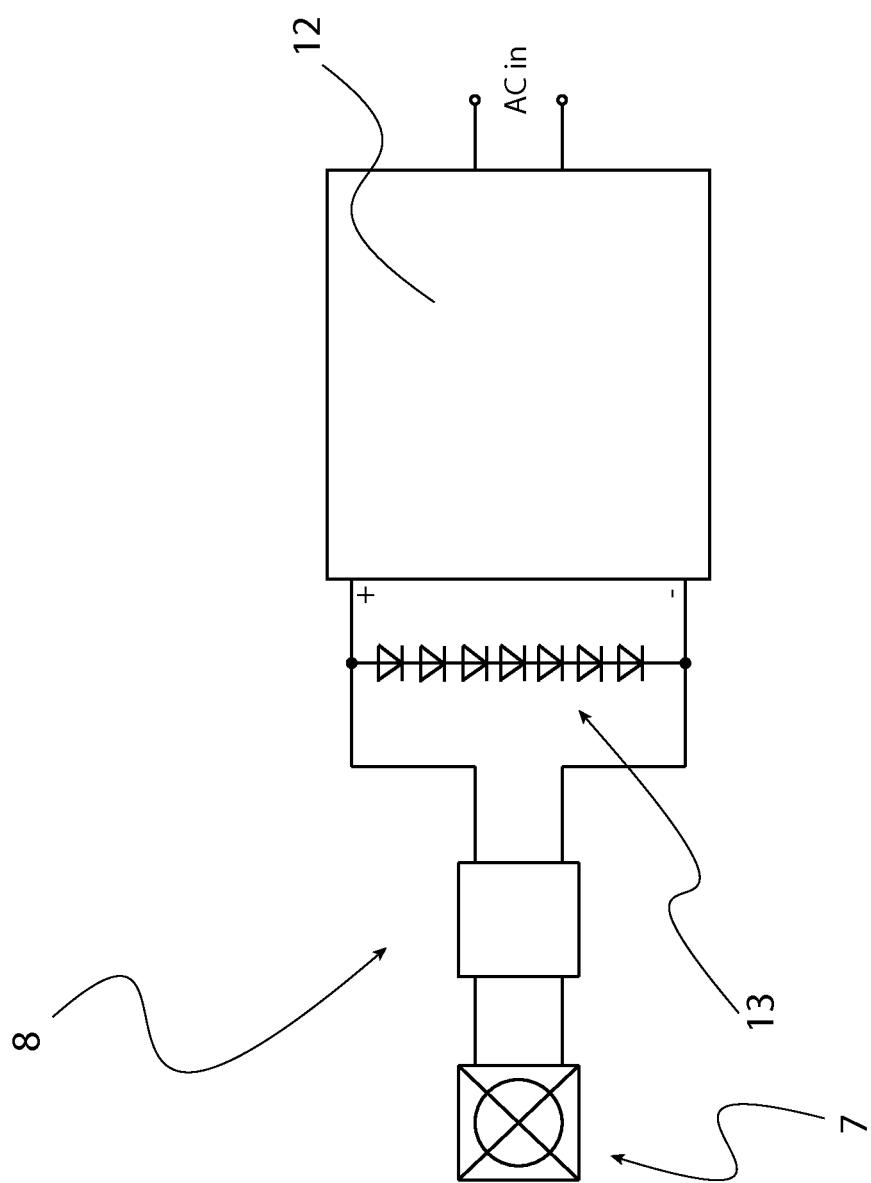
FIG. 6 is a schematic for a cooling module.
Figure 7:
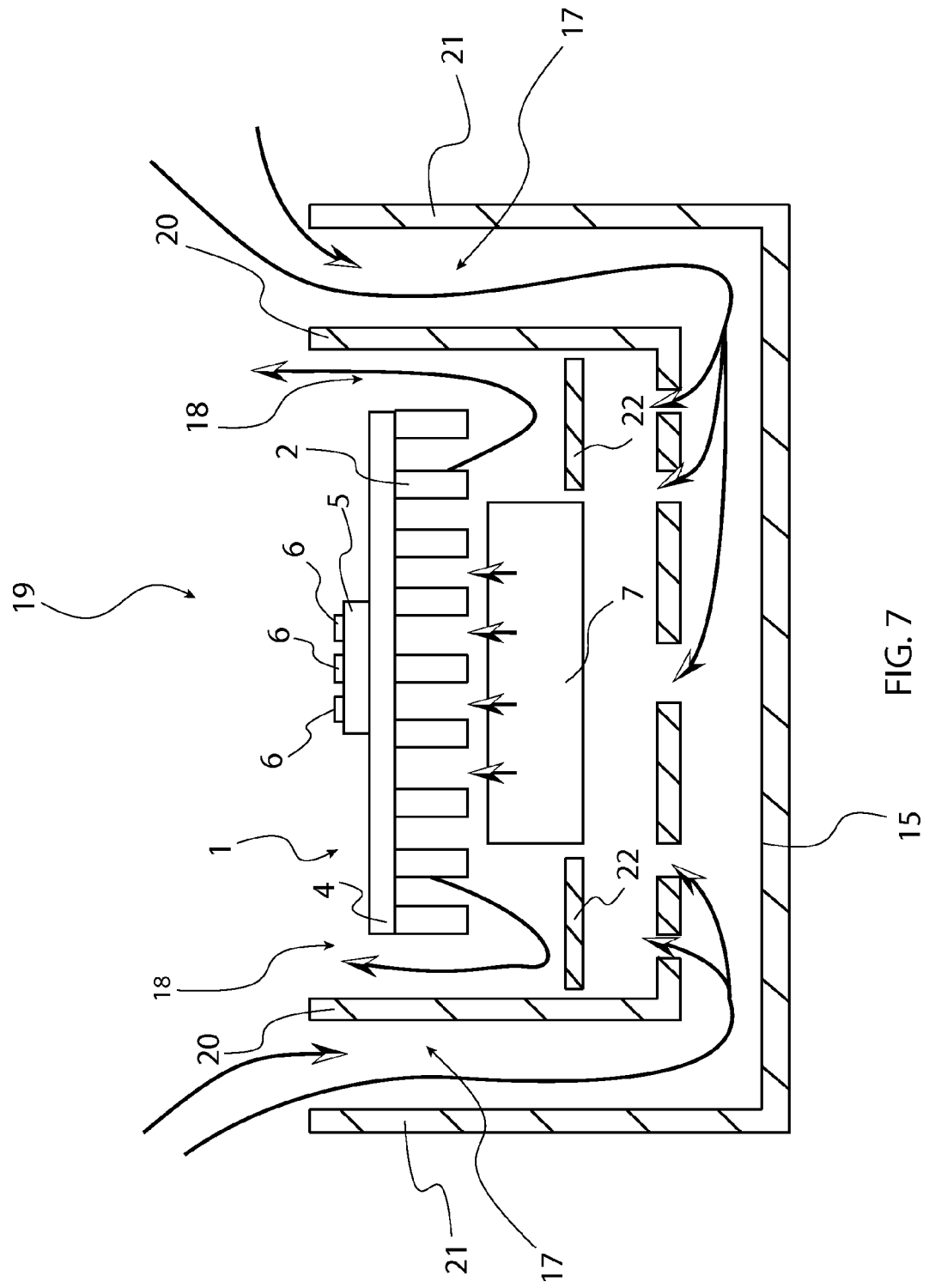
FIG. 7 is a sectional view of a cylindrical enclosure.

In reference to FIG. 5, FIG. 6, FIG. 7 using a voltage regulator system 8, means that a single voltage source can be used to power both the LEDs 6 and the fans 7. This is achieved by having the voltage regulator circuit reduce the voltage to an appropriate level for the fan 7 so that they operate at the desired speed, while full power is provided to the LEDs 6. For example, it is relatively straightforward to employ the buck regulator circuit 9 to reduce the voltage from as high as 60 volts down to as low as 3 or 4 volts. Although there is typically little need, it is feasible to adapt a standard "off line" buck regulator 9, available from any number of semiconductor manufacturers to create low voltage operating levels from DC input in the hundreds of volts. The buck regulator circuit 9 can achieve efficiencies over 85% regardless of the degree of voltage reduction. Linear or resistor circuits become more and more inefficient with greater difference between the source voltage and the desired fan voltage.

In reference to FIG. 11, the cooling fans 7 are normally available in a selection of 5, 12 or 24 volt models, each category having options for different speed and air flow. In the proposed embodiment, the air flow is important in order to achieve the desired system thermal resistance characteristics. However, other factors come into play such as acoustic noise, dust susceptibility, fan life expectancy, operating temperature and, most importantly, the ability to operate from an extremely wide range of available operating voltages, a range much wider than the fan specification will allow.

Using a circuit which can reduce and hold constant a voltage which already exists, means that the voltage from the same power supply driving the LED array can be directed to the regulator where it is reduced to the level appropriate to drive the fan at the desired speed. For example, it is relatively straightforward to employ buck regulator to reduce the voltage from as high as 60 volt down to as low as 3 or 4 volts. Although there is typically little need, it is feasible to adapt a standard "off line" buck regulator IC, available from any number of semiconductor manufacturers to create under-24V operating levels from DC inputs voltages in the hundreds of volts.

The buck regulator can achieve efficiencies over 85% regardless of the degree of voltage reduction. Whereas, the linear or resistor circuits become more and more inefficient with greater difference between the source voltage and the desired fan voltage Higher power LED lighting fixtures (typically rated above 10 watts) or retrofit lamps often require a constant-current LED power supply with an output of more than 15 volts and very often up close to even 60 volts. With the emergence of high brightness LED lighting in recent years, passive cooling has been the typical approach, and techniques using fans have largely been ignored. However, when higher power and illumination levels are desired, an active cooling system with a fan often can be the best cooling method. Without a specialized circuit approach, a separate power supply would be necessary to power the fan alone.

In reference to FIG. 6, the various electrical connections between the components in the cooling module are shown. The components include a power supply 12, an LED string 13, a voltage regulator and distribution system 8, and the fan 7. With the LED string 13 symbolically representing the location of the LEDs 6 in the circuitry. The connections ensure that the power supply 12 is able to transfer the appropriate voltage to all the components included in the cooling module.

Referring to FIG. 3, FIG. 4, FIG. 5 and FIG. 6, for a commercial product sold across many distribution channels where the overall voltage required by the LED string 13 may not be not known, the buck regulator 9 may be preferred circuit since it will always be efficient, as well as the cooling performance and acoustic noise reduction will be 100% predictable. When the LED string 13 voltage is specifically known, a choice can be more knowledgeably made, as previously noted, based on cost, efficiency, and voltage level. In these scenarios, the linear regulator circuit 10 or the simple resistor circuit 11 is preferred.

It is has been noted that fan life is directly related to bearing wear and such wear is in turn closely related to the number of rotations in a fan's life. Therefore, reducing the fan voltage and speed by 50% can double fan life expectancy. Surprisingly, with much lower fan speed and consequent air flow, the cooling effectiveness of a system does not typically decrease proportionately. For example, cutting the air flow in half may only drop the cooling efficiency by 25-30%. At the same time, the acoustic noise, because of inverse-square-law effects, typically drops at a faster rate and might be only be 10-20% what it was at full voltage. These figures can vary somewhat for any given fan of similar design but the important fact is that reducing the fan speed, because of non-linear relationships of speed to cooling and noise, can provide significant benefits which might not be intuitive. Furthermore, low speed results in considerably less air turbulence near the fan intake and in the air leaving the heat sink fins or fins. In controlled experiments, it was observed that a 60 mm fan, operating at normal voltage and speed in a transparent, shoebox-sized container filled with a substantial amount of talcum powder (a standard material used for considered laboratory dust testing), with a concentration of "dust" over 100,000 times that of a normal office or retail environment, blew talcum powder everywhere within the container, as shown in the article "Effect of Dust on Computers on dust" (3). When that same fan was operated at a lower voltage, in the cooling-module configuration described herein, there was no evidence of turbulence-caused disturbance of the powder after tens of hours at the fan intake or heat sink exhaust. In other words, it was observed that the almost imperceptible turbulence where air enters and leaves the system, has little consequence on the system dust susceptibility from a passive heat sink cooling system.

Referring to FIG. 6, FIG. 12, and FIG. 15, a typical cooling enclosure 14 is shown with its components. All of the components, except for the power supply 12, are placed in the cooling enclosure 14. In addition to the substrate 5 holding the LEDs 6, there is a small PCB 16 holding the voltage regulator system 8. The LEDs 6 and substrate 5 are mounted onto the mounting surface 4 on the heat sink 1 so that the heat sink 1 is able to dissipate heat away from the LEDs 6 during operation. Air enters the system through a plurality of intake vents 17, located in a housing wall 15 at the bottom of the cooling enclosure 14, and is brought upwards by the fan 7 the air then contacts the heat sink 1. The air impacts the mounting surface 4 of the heat sink 1 at a perpendicular angle. If there are protrusions 2, 3 on the mounting surface 4, the air will travel along the axis of the protrusions. When protrusions are present, the surface areas of the protrusions are additive to the area of the plate alone. The added surface area, in the presence of air flow of at least 50-100 linear feet per minute, can have a decrease in thermal resistance inversely proportional to the increase in surface area. The air then exits through a plurality of exhaust vents 18, on the sides of the upper portions of the enclosure 14. The enclosure 14 serves as a plenum chamber, ensuring reasonably consistent air pressure for all the components within its confines. The enclosure 14 also ensures that air exits only after passing over the surface area of the heat sink 1.

Maximum effectiveness, otherwise known as lowest thermal resistance, of this configuration is primarily a function of the air speed, plate surface area, and, if applicable, protrusion surface area, inter-protrusion spacing, and protrusion thermal conductivity. Thermal resistance for any arrangement can almost always be reduced. However, this is accomplished at the expense of size, cost or acoustic noise. Depending on the desired operating conditions and performance aspects, there are different combinations for optimal design, and each combination of components must be chosen carefully.

Referring to FIG. 1 and FIG. 2, the following guidelines apply regardless of whether there are pin protrusions 2 or fin protrusions 3. In a case where there is only the mounting surface 4, there is reduction in surface area but the reduction in cooling effectiveness is not nearly as much as might be expected. The air, directed perpendicularly to the surface of the mounting surface 4 and, even at relatively low velocity, creates high surface turbulence and extremely effective heat exchange. Such a method is known in the art as "impingement cooling" and is the basis for many heat exchangers used for microprocessors and similar high dissipation chip packages. In reference to "Impingement-cooled heatsink", depicts such a commercially available fan-cooled impingement heat sink (4). In reference to FIG. 7, the heat sink 1 is contained within a vented cylindrical cooling enclosure 19. Accompanying the heat sink 1 in the cylindrical enclosure 19 are the LED substrate 5, the LEDs 6, the cooling fan 7, an inner cylinder 20, an outer cylinder 21 and a plurality of baffles 22. The baffles 22 are flat and donut-shaped, and they fill in the holes between the heat sink 1 and the inner cylinder 20. The cylindrical enclosure 19 is configured so that there are concentric cylinders surrounding the substrate 5. The baffles 22 ensure that the fan 7 can only draw in air through the opening between the outer cylinder 21 and the inner cylinder 20. The baffles 22 also make sure exhaust air can only leave via the inner cylinder 20. The result is that cool air is drawn in though the intake vents 17 and warm air is exhausted through the exhaust vents 18. Heat exchange in the same plane as the LEDs 6 means that the cylindrical enclosure 19 can be placed within a ceiling opening which is sealed from any intake of air from any place above the ceiling. Such sealed fixtures, designated as in-ceiling (IC) rated, are increasingly mandated for new residential construction as a technique to reduce heating/cooling losses through the ceiling areas. Without such access to cool ambient air and coaxial heat exchange, recessed down-light fixtures exhibit heat buildup, resulting in reduction in permissible power dissipation within the fixture. Such coaxial heat exchanges permit high power and lumen output wherever a cylindrical LED light fixture has severe restriction in the availability of moving cool air across internal heat sinks. The configuration can also be useful for track-light cans as wells as those employed in down-lights.

In reference to FIG. 7, the cylindrical enclosure 19 keeps the intake vents 17 and exhaust vents 18 out toward the edge of the interior, near the housing wall 15, so that the central area can be reserved for the LED substrate 5 and accessories for optics necessary for a smooth central light patterns. In practice, coaxial heat exchange via the two concentric outer openings, even when intake and exhaust openings are narrow, can result in more than doubling of power dissipation capability compared with one without the arrangement. To achieve comparable heat exchange without this coaxial active cooling arrangement in a space having limited access to ambient air typically requires complicated, costly, and large, heavy heat sinks. In this type of arrangement it is important that the exiting warm air not be significantly mixed with the incoming cool air. Excessive mixing results in the intake air being already warmed and overall cooling would be greatly compromised The positioning of the vents also leaves the central area available for a size able array of closely spaced LEDs 6 an appropriate for single lens arrangements.

Active cooling systems currently exist as embodied in the Philips Endura MR16 lamp, where air is drawn into the perimeter in the center of the lamp the center and expelled through a hole in the center. Such a lamp, being rated at only 10 watts, and having the traditional but relatively undesirable, multi-LED "pixel" appearance can provide satisfactory performance for its intended purpose but is not thought herein to be compatible with many of the current trends in commercial light-fixture optical appearance and with multi-chip-LED-array, single-point-light sources being introduced by such companies as Bridgelux, Cree, Citizens, Luminus, Samsung, Osram, Phlips, LedEngin and Edison-Opto. Use of such arrays is increasingly viewed as conducive to being able to replicate, with LED lamps, the more traditional smooth light pattern of single-filament halogen PAR lamps.

In many outdoor applications there is an increasing need to provide high levels of LED power (i.e. light output) while maintaining a weather-tight enclosure. That is, there can be no intake or exhaust vents for cooling, whether or not a fan is inside. One way to address this issue is with a thermally conductive metal enclosure having large finned outer surfaces. Another method would be to have a metal or plastic enclosure having no fins but of very substantial internal air volume. In either case, there is typically a substantial penalty in size, weight or cost or a combination of all.

There have been many lighting products in past decades where an enclosure for a heat-dissipative product has contained a fan to move air around to prevent "hot spots" within an enclosure. There is no question that such approaches can have some application-specific benefit. However, in an LED-based system, it becomes particularly important to characterize exactly how heat moves from an LED chip to the ambient air so that the LED junction temperature can be rather accurately determined. LED brightness, not only initially, but over time, is significantly dependent on junction temperature.

Figure 8:
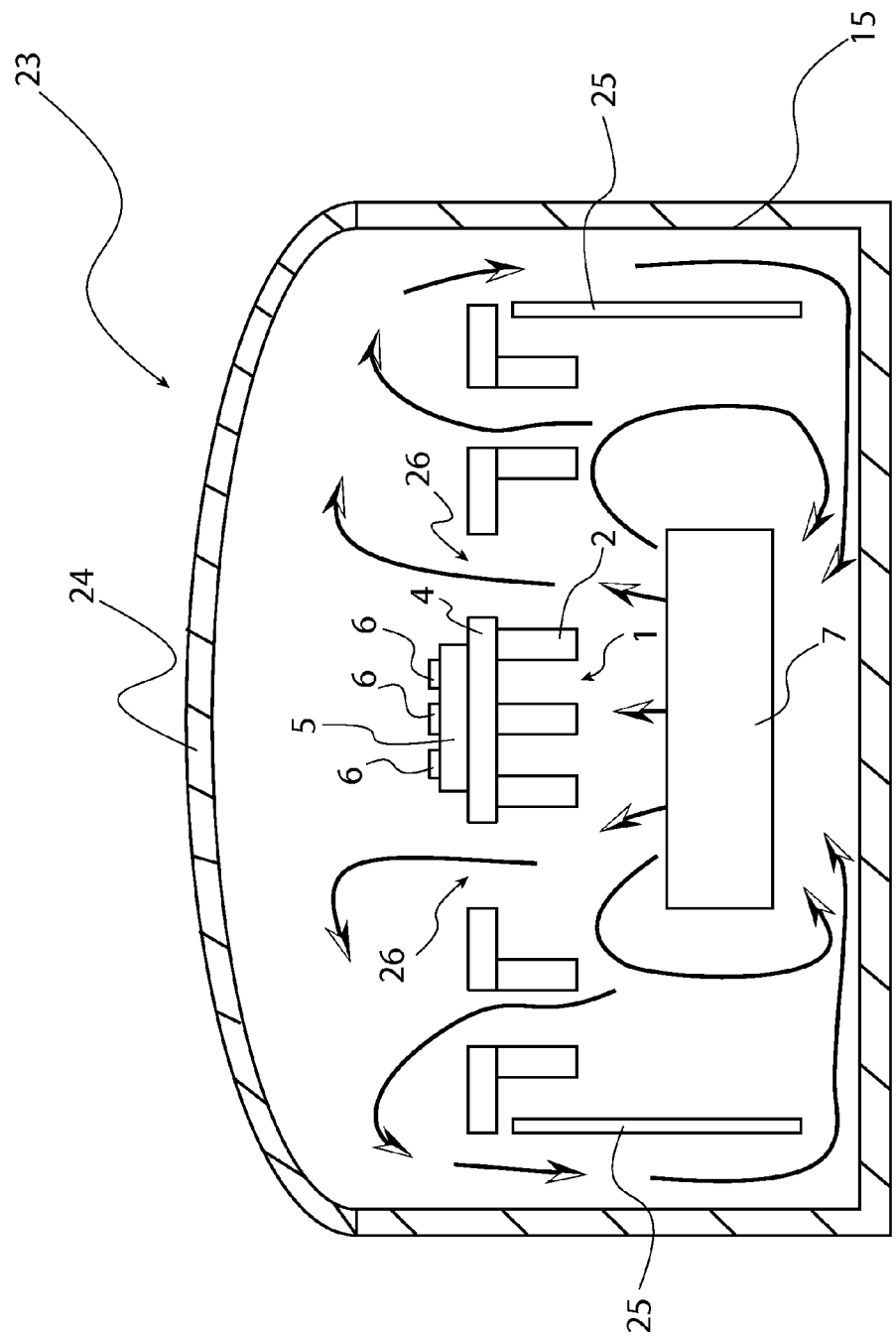
FIG. 8 is a sectional view of a capped cylindrical enclosure.

In reference to FIG. 8, the heat sink 1 resides in a capped cooling enclosure 23 having a lens cover 24 through which LED-originated light passes. The lens cover 24 for such an enclosure, whether for street lighting, parking lot lighting or other outdoor application, may be completely transparent or may have a light-diffusive lens surface. The capped enclosure 23 comprises also the fan 7, air baffles 25 an LED substrate 5, and LEDs 6. The substrate 5 is attached to the mounting surface 4 on one side as the pin protrusions 2 are located on the other. However, other protrusion configurations are suitable. As with previously described configurations, the fan 7 directs the air it draws in to the heat sink 1 and the pin protrusions 2, after which the air is directed sideways away from the components. However, at that point the air movement differs from the previously noted configurations. In this case there are no enclosure openings for intake or exhaust air due to the addition of the lens cover 24. The only source of air for the fan 7 is the air inside of the capped cooling enclosure 23.

Referring to FIG. 8, this capped cooling enclosure 23 reduces all significant thermal resistances from the components to the ambient air. Once air has been expelled by the fan 7, the air is redirected at approximately 90 degrees outward and is drawn back to the fan 7 because of the low pressure area near the fan intake. However, the heat sink 1 is not one uniform structure and has a number of openings 26 in it, allowing air to distribute better, including up into the open space above the LEDs 6. This heated air is drawn back downward around the outer edges of the heat sink 1 by the low pressure in the fan intake. The air baffles 25 and the housing wall 15 create a pocket along the edge to direct air back down towards the fan intake and ensuring the air travels the maximum distance before returning to the fan 7.

In reference to FIG. 8, in a perfect situation, all warmed moving air would travel very close to the housing wall 15, in circulating loops, so as to contact all inner surfaces of the capped enclosure 23 and be cooled by the housing wall 15, which are in contact with the outer ambient. One would not normally think of the housing wall 15 as a heat sink unless they were metallic with fins attached to them. This is little different from the walls of a heated house in the middle of winter. The walls act as a "heat sink" or heat exchanger, where the heat inside the house is transferred through the walls to the cooler outside temperature. Furthermore, warmed air which moves rapidly across those walls transfers the heat more effectively than static air, with a predictable thermal resistance, to the outside air. It can be seen here that moving air transferring heat from the air to the walls is essentially the opposite of normal convective cooling where moving air transfers heat to the cooler air. This is essentially a two-step process where the first step involves transferring heat to the air at the heat sink 1 and the second step involves transferring heat from the air to the surface of the housing wall 15.

There are two main thermal resistances which determine the effectiveness of the system. The first is associated with the fan/heat sink configuration. The second is a combination of the volume of air within the total enclosure, the total inner surface area and the "exchange factor", that is, the degree to which all air is moved in a loop to come close to the outer wall and be engaged with heat exchange with the walls. The enclosure form factor and inside air baffling can greatly influence that exchange factor.

In reference to FIG. 8, the two-step process results from there being two circulating loops of air, one below the heat sink 1 and one occupying the rest of the interior. These two loops ensure that all the air in the capped cooling enclosure 23 is used and there are ample opportunities to exchange heat with the cooler ambient along the housing wall 15. Air that leaks through the heat sink holes 26 into the upper area are also able to bring cooler air down to the fan intake to constantly cycle cool air throughout the system.

If a heat sink were placed in an enclosure with a fan blowing air against it but with limited circulation loops throughout the enclosure, there would be a minimal increase in thermal resistance. This is due to the inability of the hot air to move around effectively throughout the enclosure, resulting in heat build ups in certain areas of the enclosure. There is prior art, much of it proprietary and not published, where blowers or heat sinks have been placed inside high-power light fixtures to prevent excessive heat buildup in a given spot, even in some incandescent fixtures such as in high-power stage lighting. However, the objective herein is not to simply to cool a specific hot spot within the enclosure but to treat the entire capped cooling enclosure 23 as a complete thermal system with a characterized thermal resistance from the LEDs 6 to the outside ambient, with numerous circulating air loops designed to minimize thermal resistance from the heat sink 1 to outside ambient air.

In reference to "Impingment-cooled heat sink", it is described that a sealed lighting enclosure system in which there is a fan-cooled heat sink heat sink and air circulation within the enclosure (4). However, as in other prior-art sealed systems with internal fans, the description addresses heat exchange with wall surface only in general terms and does not specifically detail the interactions which occur whereas the present invention describes the air and wall heat transfer interactions.

The present invention, a closed-system configuration, is not novel in having a fan inside, but rather in the specific methodology to reduce LED-to-ambient thermal resistance to the lowest value for any given sealed enclosure which is not dependent on finned or thick metallic outer surfaces for cooling. Portions of these systems can be mass-produced sub assemblies so that a user can tailor a variety of end products for particular performance characteristics. In other words, these configurations can be produced by one manufacturer as either a single total assembly or as separate assemblies by two or more companies, to be combined into a single product by an end user.

Figure 9:
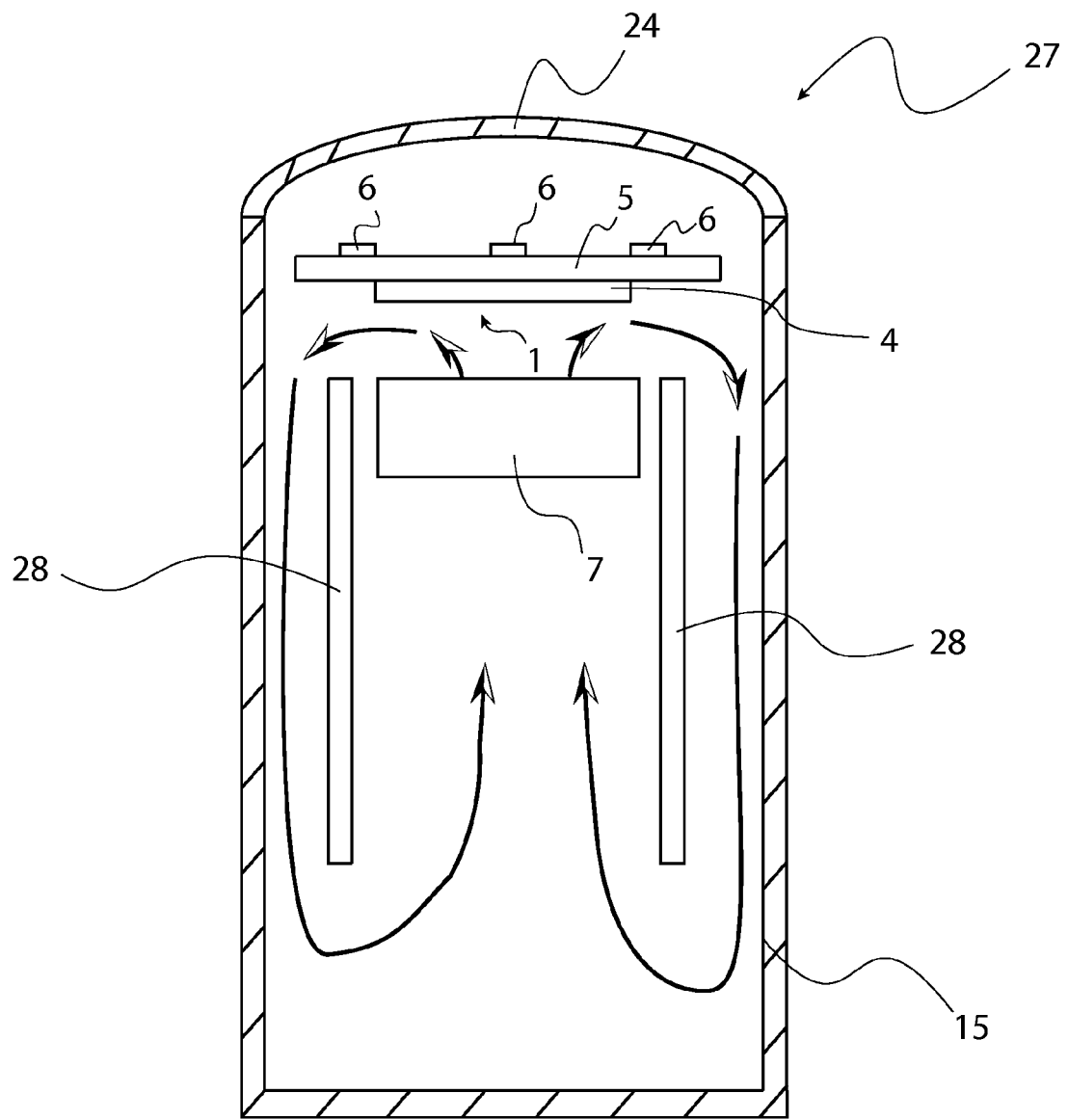
FIG. 9 is a sectional view of an elongated cylindrical enclosure.

In reference to FIG. 9, a more simplified configuration can be created where physical design constraints do not allow a straightforward upper and lower chamber arrangement as previously discussed. The resulting system is an elongated cylindrical enclosure 27. Within the elongated cylindrical enclosure 27 are a heat sink 1, the fan 7, a LED substrate 5, LEDs 6, a lens cover 24, and cylindrical partitions 28. The cylindrical partitions 28 are parallel to the housing wall 15 of the enclosure 27 and create pockets on the edges for air to travel. When warm air leaves the heat sink 1 it then travels back down the pockets to the fan intake due to the lower pressures present at the fan intake, the air gradually cools as it passes along the housing wall 15. The partitions 28 help prevent the cooler air from mixing with the warmer air, as well as provide a longer journey for the air to return to the fan 7 so that it has a chance to cool off as much as possible.

Figure 10:
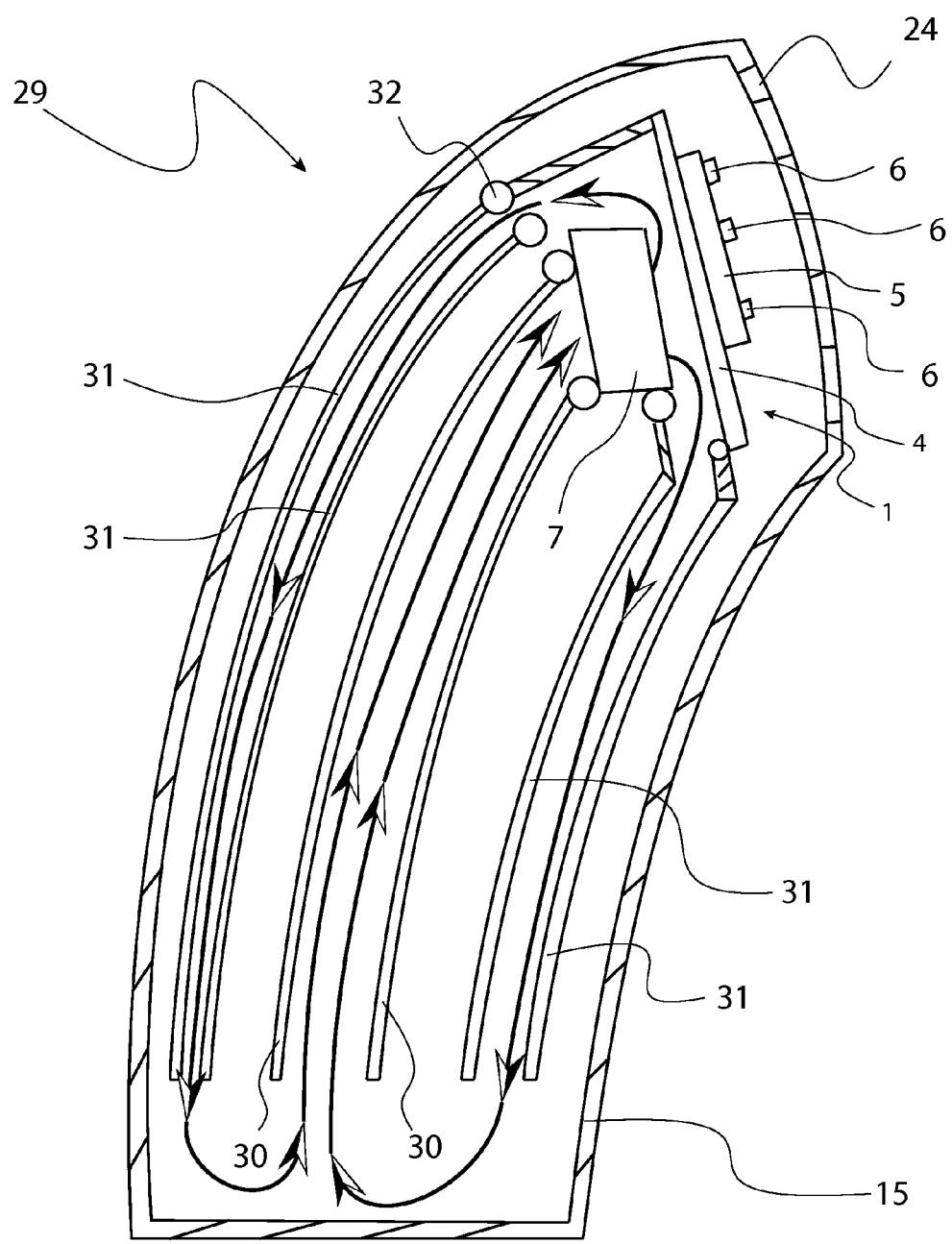
FIG. 10 is a sectional view of a curved cylindrical enclosure.

In reference to FIG. 8, FIG. 9, and FIG. 10 the thermal resistance of this system is primarily based on the thermal resistance of the cooled heat sink 1 plus the thermal resistance of the moving-air-to-walls and the surface area of the housing wall 15 exposed to the typically cooler outside ambient. It is not particularly relevant whether the housing wall 15 is metal or plastic as long it is not very thick (considerably over 0.125 inches) or a highly porous and insulating material.

Shown in FIG. 9 and FIG. 10, is a configuration similar to the elongated cylinder enclosure 27 and contains many of the same components. However, a curved cylindrical cooling enclosure 29 has the addition of a plurality of flexible fan exhaust tubes 31, and a plurality of flexible fan intake tubes 30. The exhaust tubes 31 and the intake tubes 30 are attached to the fan 7 with a plurality of fasteners 32. These fasteners 32 do not need to be air tight for satisfactory operation. Some air leakage through the fasteners 32 is of little consequence because of the previously mentioned non linear relationship between air flow volume and cooling. However, in this case, the curved enclosure 29 is not a simple cylinder or square as seen from above and straight lines as seen from the side. It could be curved or shaped in a multitude of ways in which cooler air comes from places distant from the actual light emitting surface. Consequently, it might not be feasible or cost effective to use a single tube to channel intake and exhaust air. Instead, as shown, it is possible to achieve the same effect by simply having flexible intake tubes 30 between the rear of the fan 7 and the curved enclosure 29, which collect cooler air, air that is expelled by the fan 7 after it has cooled the heat sink 1. Such an arrangement can allow effective cooling of a high power LED light fixture in a small enclosure of complex shape, in a manner far more cost effective than what are known in the trade as heat pipes, which are known as conduits using water, phase-change techniques or thermal conductive metal shapes.

Although the invention has been explained in relation to its preferred embodiment, it is to be understood that many other possible modifications and variations can be made without departing from the spirit and scope of the invention as hereinafter claimed.

What is claimed is:

1. A cooling apparatus for highly dissipative LEDs comprises of, a vented cylindrical cooling enclosure (19);
a heat sink (1);
a cooling fan (7);
a voltage distribution and regulation system (8), (9), (10), (11);
the heat sink (1) comprises of a mounting surface (4) for a plurality of LEDs (6) or a LED substrate (5) and a plurality of protrusions (2), (3); and
the heat sink (1), the cooling fan (7), and the voltage distribution and regulation system (8), (9), (10), (11) being housed and fixed inside the vented cylindrical cooling enclosure (19);
the cylindrical cooling enclosure (19) comprises of an inner cylinder (20), an outer cylinder (21), a plurality of baffles (22), a housing wall (15), a plurality of intake vents (17) and a plurality of exhaust vents (18);
the plurality of intake vents (17) being located in between the inner cylinder (20) and the outer cylinder (21);
the plurality of exhaust vents (18) being located above the cooling fan (7);
the plurality of exhaust vents (18) being located in between the inner cylinder (20) and the heat sink (1);
the plurality of baffles (22) being parallel to the heat sink (1); and
the inner cylinder (20), the outer cylinder (21), the housing wall (15) and the plurality of baffles (22) creating channels to help direct and control air flow within the vented cylindrical cooling enclosure (19).

2. The cooling apparatus for highly dissipative LEDs as claimed in claim 1 comprises,
the voltage distribution and regulation system (8), (9), (10), (11) electrically connecting both the cooling fan (7) and the plurality of LEDs (6), within the vented cylindrical cooling enclosure (19), to one individual DC voltage source providing constant current power; and
the voltage distribution and regulation system (8), (9), (10), (11) controlling the voltage levels received by the cooling fan (7) by increasing or decreasing its value.

3. The cooling apparatus for highly dissipative LEDs as claimed in claim 1 comprises,
the plurality of protrusions (2), (3) being thin pin cylinders or fins;
the plurality of protrusions (2), (3) being affixed to one side of the mounting surface (4) for a plurality of LEDs (6) or a LED substrate (5) opposite to that where the plurality of LEDs (6) or the LED substrate (5) are mounted;
the heat sink (1) being positioned above the cooling fan (7); and
the plurality of protrusions (2), (3) being oriented to point toward the cooling fan (7).

4. The cooling apparatus for highly dissipative LEDs as claimed in claim 3 comprises, the cooling fan (7) being oriented to direct air perpendicularly towards the heat sink (1); and the cooling fan (7) being oriented to draw in ambient air from the plurality of intake vents (17), and blow air out of the plurality of exhaust vents (18).

5. A cooling apparatus for highly dissipative LEDs comprises of, a capped cooling enclosure (23);
the capped cooling enclosure (23) being fully enclosed;
a heat sink (1);
a cooling fan (7);
a voltage distribution and regulation system (8), (9), (10), (11);
the heat sink (1) comprises of a mounting surface (4) for a plurality of LEDs (6) or a LED substrate (5) and a plurality of protrusions (2), (3); and
the heat sink (1), the cooling fan (7), and the voltage distribution and regulation system (8), (9), (10), (11) being housed and fixed inside the capped cooling enclosure (23);
the capped cooling enclosure (23) comprises of a housing wall (15), a plurality of air baffles (22), and a lens cover (24);
the plurality of air baffles (22) and the housing wall (15) creating channels to help direct and control air flow within the capped cooling enclosure (23);
the plurality of air baffles (22) being perpendicular to the cooling fan (7) and the heat sink (1);
the plurality of air baffles (22) being parallel to the housing wall (15);
the plurality of air baffles (22) and the housing wall (15) creating pockets for air flow near the housing wall (15); and
the lens cover (24) enclosing the capped cooling enclosure (23).

6. The cooling apparatus for highly dissipative LEDs as claimed in claim 5 comprises, the voltage distribution and regulation system (8), (9), (10), (11) electrically connecting both the cooling fan (7) and the plurality of LEDs (6), within the capped cooling enclosure (23), to one individual DC voltage source providing constant current power; and
the voltage distribution and regulation system (8), (9), (10), (11) controlling the voltage levels received by the cooling fan (7) by increasing or decreasing its value.

7. The cooling apparatus for highly dissipative LEDs as claimed in claim 5 comprises, the plurality of protrusions (2), (3) being thin pin cylinders or fins;
the plurality of protrusions (2), (3) being affixed to one side of the mounting surface (4) for a plurality of LEDs (6) or a LED substrate (5) opposite to that where the plurality of LEDs (6) or the LED substrate (5) are mounted;
the heat sink (1) being positioned above the cooling fan (7); and
the plurality of protrusions (2), (3) being oriented to point toward the cooling fan (7).

8. The cooling apparatus for highly dissipative LEDs as claimed in claim 7 comprises, the cooling fan (7) being oriented to direct cool air perpendicularly towards the heat sink (1); and
the cooling fan (7) being oriented to circulate warm and cool air throughout the capped cooling enclosure (23).

9. The cooling apparatus for highly dissipative LEDs as claimed in claim 8 comprises of, a curved cylindrical cooling enclosure (29);
the curved cylindrical cooling enclosure (29) being fully enclosed;
a heat sink (1);
a cooling fan (7);
a voltage distribution and regulation system (8), (9), (10), (11);
the heat sink (1) comprises of a mounting surface (4) for a plurality of LEDs (6) or a LED substrate (5) and a plurality of protrusions (2), (3); and
the heat sink (1), the cooling fan (7), and the voltage distribution and regulation system (8), (9), (10), (11) being housed and fixed inside the curved cylindrical cooling enclosure (29).

10. The cooling apparatus for highly dissipative LEDs as claimed in claim 9 comprises, the voltage distribution and regulation system (8), (9), (10), (11) electrically connecting both the cooling fan (7) and the plurality of LEDs (6), within the curved cylindrical cooling enclosure (29), to one individual DC voltage source providing constant current power; and
the voltage distribution and regulation circuit (8) controlling the voltage levels received by the cooling fan (7) by increasing or decreasing its value.

11. The cooling apparatus for highly dissipative LEDs as claimed in claim 9 comprises, the curved cylindrical cooling enclosure (29) comprises of a lens cover (24), a plurality of flexible fan exhaust tubes (31), a plurality of flexible fan intake tubes (30), a housing wall (15), and a plurality of fasteners (32);
the plurality of fasteners (32) attaching the plurality of flexible fan intake tubes (30) to the cooling fan (7);
the plurality of fasteners (32) attaching the plurality of flexible fan exhaust tubes (31) to the cooling fan (7) and the heat sink (1);
the plurality of flexible fan exhaust tubes (31) and the plurality of flexible fan intake tubes (30) creating channels to help direct and control air flow within the curved cylindrical cooling enclosure (29);
the housing wall (15) being curved and non linear; and
the lens cover (24) enclosing the curved cylindrical cooling enclosure (29).

12. The cooling apparatus for highly dissipative LEDs as claimed in claim 9 comprises, the plurality of protrusions (2), (3) being thin cylinders or fins;
the plurality of protrusions (2), (3) being affixed to one side of the mounting surface (4) for a plurality of LEDs (6) or a LED substrate (5) opposite to that where the plurality of LEDs (6) or the LED substrate (5) are mounted;
the heat sink (1) being positioned above the cooling fan (7); and
the plurality of protrusions (2), (3) being oriented to point toward the cooling fan (7).

13. The cooling apparatus for highly dissipative LEDs as claimed in claim 12 comprises, the cooling fan (7) being oriented to direct air perpendicularly towards the heat sink (1); and
the cooling fan (7) oriented to draw in cool air through the plurality of flexible fan intake tubes (30) and blow out hot air through the plurality of flexible fan exhaust tubes (31).

* * * * *